Patented Mar. 30, 1954

2,673,864

UNITED STATES PATENT OFFICE 2,673,864

STEROID 4-OXYGENATED TRIKETONES

George B. Spero and Robert H. Levin, Kalamazoo Township, Kalamazoo County, Mich., assignors to The Upjohn Company, Kalamazoo, Mich., a corporation of Michigan No Drawing. Application May 23, 1952,
Serial No. 289,674

17 Claims. (Cl. 260—397.45)

The present invention relates to certain steroid 4-oxygenated triketones and is more particularly concerned with 4-hydroxy and 4-acyloxy-17α-hydroxypregnane-3,11,20-triones and to a novel process for the production thereof.

This application is a continuation-in-part of our copending application Serial Number 256,962, filed November 17, 1951, and our copending application Serial Number 255,732, filed November 9, 1951, both now abandoned.

The novel compounds of the present invention are the 4-hydroxy and 4-acyloxy-17α-hydroxypregnane-3,11,20-triones, which may be represented by the following structural formula:

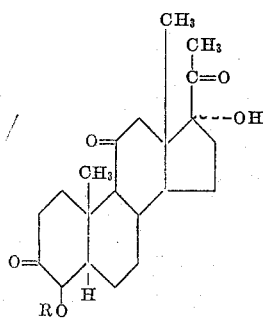

wherein RO is a member of the group consisting of hydroxy (OH) and acyloxy of the formula AcO, Ac being the acyl residue of an organic carboxylic acid, especially such acids containing from one to eight carbon atoms, inclusive.

The process of the present invention for producing this novel triketone containing a 4-hydroxy group includes saponifying a starting 3(4),17(20)-dioxide of a poly-enol acylate of pregnane-3,11,20-trione wherein the acyloxy groups are derived from an organic carboxylic acid, especially such acids containing from one to eight carbon atoms, inclusive, in solution in an organic solvent which is non-reactive under the conditions of reaction, with an alkali metal hydroxide to produce the desired 4,17α-dihydroxypregnane-3,11,20-trione.

The novel process of the present invention further involves esterification of 4,17α-dihydroxypregnane-3,11,20-trione and includes mixing together the starting 4,17α-dihydroxypregnane-3,11,20-trione with a compound selected from the group consisting of acid anhydrides and acid chlorides of organic carboxylic acids, especially such acids containing up to eight carbon atoms, inclusive, in excess of the amount theoretically required to produce the desired acylate, and recovering the thus-produced 4-acyloxy-17α-hydroxypregnane-3,11,20-trione.

An object of the present invention is to provide a method for the preparation of 4,17α-dihydroxypregnane-3,11,20-trione and 4-acylates thereof. Another object of the present invention is to provide a method for acylating the 4-hydroxy substituent of 4,17α-dihydroxypregnane-3,11,20-trione without concomitantly acylating the 17α-hydroxy substituent. An additional object of the present invention is to provide novel 4-oxygenated-17α-hydroxypregnane-3,11,20-triones, which are useful in the preparation of physiologically-active compounds of the 17α-hydroxy-11-keto series. Other objects of the present invention will be apparent to those skilled in the art to which this invention pertains.

The novel process of the present invention has utility in the preparation of certain steroid acylates having an oxygen atom in the 11-position of the steroid nucleus. Thus, the process of the present invention is of especial interest in the field of steroid research, since the oxygenated cortical hormones are known to possess biological activity which is markedly different from that of unoxygenated steroids. The novel compounds of the present invention have utility as intermediates which can be employed in a series of syntheses leading to the preparation of biologically-active 17α-hydroxy-11-keto steroids, such as cortisone acetate. For example, the 4-acyloxy-17α-hydroxypregnane-3,11,20-triones may be brominated with bromine in chloroform to yield the corresponding 21-bromide which on reaction with potassium acetate in acetic acid yields a 4-acyloxy-21-acetoxy-17-hydroxypregnane-3,11,20-trione. Removal of the 4-acyloxy group from a 4-acyloxy-21-acetoxy-17α-hydroxypregnane-3,11,20-trione, by pyrolysis, or other means, yields cortisone acetate. In addition the 4-acyloxy-17α-hydroxypregnane-3,11,20-triones of the present invention may be converted to the known 17α-hydroxy-4-pregnene-3,11,20-trione (Sarett, U. S. Patent 2,541,104) on removal of the 4-acyloxy group by pyrolysis.

The novel 4-acyloxy compounds of the present invention which are of particular interest are those compounds having the above generic formula, wherein the acyloxy group contains up to eight carbon atoms, inclusive, and represents an acylate formed from a suitable organic acid, or acid anhydride or acid chloride of an organic acid, such as the fatty acids, e. g., formic, acetic, propionic, butyric, valeric, hexanoic, heptanoic, and octanoic; or dibasic acids, e. g., malonic, succinic and others. Acid chlorides or anhydrides of cycloaliphatic acids, such as cyclopentanoic, cyclohexanoic, and others, and of aromatic acids, such as toluic and benzoic and the like, may also be advantageously employed in the process of the present invention. The acids may also contain substituents which are non-reactive under the conditions of the reaction, such as halogen, alkyl, alkoxy and others, and these substituents will be carried throughout the synthesis.

The novel 4-hydroxy compound of the present invention is 4,17α-dihydroxypregnane-3,11,20-trione, which may be represented by the following structural formula:

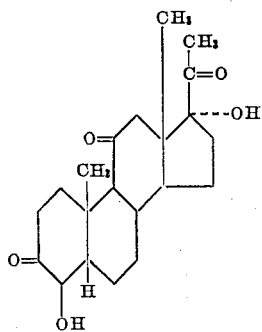

This steroid triketone is conveniently prepared by a process which includes saponifying a 3(4),17(20)-dioxide of a tri-enol acylate of pregnane-3,11,20-trione, in an organic solvent which is non-reactive under the conditions of reaction, with a solution of an alkali metal hydroxide to produce 4,17α-dihydroxypregnane-3,11,20-trione.

The starting compounds of the present invention are the 3(4),17(20)-dioxides of the poly-enol acylates of pregnane-3,11,20-trione, wherein the acyloxy groups are of the formula AcO, Ac being the residue of an organic carboxylic acid, especially such acids containing from one to eight carbon atoms, inclusive. The 3(4),17(20)-dioxides are prepared from the tri-enol acylates of pregnane-3,11,20-trione by a process which includes mixing together at a reaction temperature between about zero and about 100 degrees centigrade a tri-enol acylate of pregnane-3,11,20-trione and an epoxidizing agent such as an organic peracid or hydrogen peroxide. The enol acylates are in turn are prepared from pregnane-3,11,20-trione by a procedure which comprises heating together, at a temperature between about eighty and 180 degrees centigrade, pregnane-3,11,20-trione and an acid anhydride of an organic carboxylic acid in excess of the amount theoretically required to produce the desired enol acylate, in the presence of an acid catalyst such as sulfuric acid or a sulfonic acid. The pregnane-3,11,20-trione is a compound readily prepared by an available prior art procedure [Reichstein and Fuchs, Helv. Chim. Acta, 26, 721 (1943)]. The preparation of the starting materials employed in the process of the present invention is illustrated in greater detail in the preparations following in this specification.

In carrying out the process of the present invention, the starting dioxido steroid, i. e., the 3(4),17(20)-dioxide of a poly-enol acylate of pregnane-3,11,20-trione, is dissolved in an organic solvent which is substantially non-reactive under the conditions of reaction, such as methanol, ethanol, dioxane, and others, ethanol being preferred. The resulting solution is then admixed with an aqueous solution of a base such as sodium or potassium hydroxide, sodium carbonate, sodium bicarbonate, or other basic saponifying agent, with sodium hydroxide being preferred. The saponifying agent is usually employed in excess of the amount theoretically required to saponify the starting dioxido steroid, ratios, for example, of from between about three and twenty moles of base to about one mole of starting steroid compound being operative, the preferred ratio being about fifteen to one. The order of mixing of the steroid solution and aqueous saponifying solution is not significant, although ordinarily the aqueous saponifying solution is added to the starting steroid dissolved in an organic solvent. The resulting admixture is then permitted to stand for about twenty minutes to two hours or more, the exact time depending in part upon the temperature and in part upon the starting steroid employed, it being desirable to effect substantially complete saponification of the starting dioxide compound. Temperatures between about zero and one hundred degrees centigrade or higher may be employed, room temperatures being entirely satisfactory.

After saponification has been substantially completed, the contents of the reaction flask are generally neutralized with a dilute mineral acid, such as hydrochloric or sulfuric, ten per cent hydrochloric acid being preferred. The neutralizing agent is usually added dropwise or in small portions until all of the excess base of the saponification is neutralized. The organic solvent is next removed by conventional separation procedure such as volatilizing or distilling under reduced pressures at below about sixty degrees centigrade or by other suitable means. When ethanol is the solvent employed, removal at below about forty degrees centigrade is preferred. The desired 4,17α-dihydroxypregnane-3,11,20 - trione is then recovered from the residue in any convenient manner, such as by extraction with ether or other organic solvent, such as petroleum ether, chloroform, benzene and the like, followed by conventional purification of the extracts by washing with dilute basic solutions, such as an alkali metal hydroxide or sodium carbonate solution and water, respectively, drying the organic fraction over anhydrous sodium sulfate and evaporating to dryness. From this residue, the 4,17α-dihydroxypregnane-3,11,20-trione can be obtained by conventional procedures, such as chromatographic adsorption, fractional crystallization and the like. It is sometimes preferred not to crystallize the product, as the residue obtained after removal of the solvent is of sufficient purity to be used in subsequent reactions.

By following the procedure of the present invention, high yields of the desired 4,17α-dihydroxypregnane-3,11,20-trione are consistently obtained from the starting 3(4),17(20)-dioxide of the selected enol acylate of pregnane-3,11,20-trione.

In further carrying out the process of the present invention to produce the 4-acyloxy steroids, the 4,17α-dihydroxypregnane-3,11,20 - trione is admixed with the acid chloride or acid anhydride of the organic carboxylic acid employed as the acylating agent. The acid anhydrides or chlorides of organic carboxylic acids containing up to eight carbon atoms, inclusive, are preferably employed as the acylating agent, such as the acid chloride or anhydride of the fatty acids, dibasic aliphatic acids, cycloaliphatic acids, aromatic acids and other organic acids; the acid anhydride and the acid chloride of acetic acid being the preferred embodiment. In the case of formic acid, the free formic acid is usually employed as the acylating agent. The order of mixing is not critical and the amount of acid chloride or anhydride employed is at least the theoretical amount, and ordinarily substantially in excess of the amount theoretically required to produce the desired 4-acylate. Ratios as high as fifty or sixty molar parts of acylating agent to one molar part of 4,17α-dihydroxypregnane-3,11,20-trione are operative. Frequently, it is desirable to employ an esterification catalyst, preferably a basic compound, such as pyridine.

The reaction mixture is then permitted to stand with or without stirring, at temperatures of between about zero and 100 degrees centigrade, temperatures between about twenty and forty degrees centigrade being preferred, for periods of time varying between about one and 24 hours, the precise reaction period depending in part upon the temperature employed, the acylating agent, and esterification catalyst, if any, utilized in conducting the reaction. Preferably, the reaction mixture is permitted to stand between about eight and twenty-four hours when temperatures between about twenty and forty degrees are employed.

The desired 4-acyloxy-17α-hydroxypregnane-3,11,20-trione is then separated by any convenient means, such as by extraction with an organic solvent which is non-reactive with the reaction products, as, for example, ether, petroleum ether, benzene, chloroform, methylene chloride, and the like, followed by conventional purification of the extracts by washing with dilute basic solutions, such as dilute alkali metal hydroxide or sodium carbonate solution, and water, respectively, drying the organic fraction over anhydrous sodium sulfate and evaporating to dryness. From this residue, the desired 4-acyloxy-17α-hydroxypregnane-3,11,20-trione is obtained by conventional procedures such as crystallization from a solvent or a mixture of solvents, or, alternatively, by chromatographic adsorption over activated charcoal, alumina, or Florisil (magnesium silicate), the latter chromatographic procedure being preferred.

By following the procedure of the present invention, yields of the desired 4-acylate of 4,17α-dihydroxypregnane-3,11,20-trione greater than eighty percent of the theoretical are consistently obtained, and the acylation of the 4-hydroxy substituent is accomplished with substantially no effect on the 17α-hydroxy substituent.

The 4-acyloxy-17α-hydroxypregnane-3,11,20-triones of the present invention may be converted, if desired, to 3-ketonic nitrogen derivatives by a process which includes mixing together the 4-acyloxy-17α-hydroxypregnane-3,11,20-trione and a substantially equimolar quantity of a ketonic nitrogen reagent, such as semicarbazide, hydrazine, phenylhydrazine, dinitrophenylhydrazine, hydroxylamine and the like, usually in an organic solvent which is non-reactive under the reaction conditions. From the reaction product may be separated the thus-produced 3-ketonic nitrogen derivative of the starting 4-acyloxy-17α-hydroxypregnane-3,11,20-trione. The 3-ketonic nitrogen derivatives of the 4-acylates of the present invention may then be employed in a further series of syntheses, leading to synthetic cortical hormones of the 17α-hydroxy-11-keto type.

The following examples are illustrative of the products and process of the present invention but are not to be construed as limiting.

PREPARATION 1.—4,17α-DIHYDROXYPREGNANE-3,11,20-TRIONE (A) Two and thirty-six one-hundredths grams (2.36 grams) of pregnane-3,11,20-trione was added to a mixture of 240 milliliters of acetic anhydride and 0.96 gram of para-toluenesulfonic acid and the resulting mixture heated to approximately 140 degrees centigrade, at which temperature distillation of the acetic anhydride began. Distillation of the acetic anhydride was then continued at a slow rate for a period of five hours, at the end of which time sixty milliliters of reaction solution remained in the reaction flask. The contents of the flask were cooled, poured into ice-water and extracted with ether. The ether extract was washed with successive 100-milliliter portions of dilute sodium carbonate solution and water, respectively, dried, and passed over a column of alumina. The column was eluted with ether and the dark brown eluate concentrated to yield 3.5 grams of crude 3,11,20-triacetoxy-3,9(11),17(20)-pregnatriene. The structure was confirmed by infra-red analysis.

(B) Three and one-half grams of the 3,11,20-triacetoxy-3,9(11),17(20)-pregnatriene from (A) was dissolved in 23 milliliters of chloroform and to the resulting solution was added twelve milliliters of forty percent peracetic acid in which 0.320 gram of sodium acetate had been dissolved. The resulting mixture was shaken for a period of ninety minutes on a rotary agitating machine and the reaction mixture then diluted with 100 milliliters of ether. The reaction contents were then washed with successive 100-milliliter portions of dilute sodium bicarbonate and water, respectively, dried over anhydrous sodium sulfate, and evaporated to dryness. The residue weighed 2.2 grams, and was the 3(4),17(20)-dioxide of 3,11,20-triacetoxy-3,9(11),17(20)-pregnatriene. The structure was confirmed by infra-red analysis.

PREPARATION 2.—3(4),17(20)-DIOXIDE OF 3,11,20-TRI-PROPIONYLOXY-3,9(11),17(20)-PREGNATRIENE

Following the procedure given in Preparation 1, pregnane-3,11,20-trione is converted to the 3,11,20-tri-enol propionate with propionic anhydride, which is in turn treated with peracetic acid to yield the 3(4),17(20)-dioxide of 3-11,20-tripropionyloxy-3,9(11),17(20)-pregnatriene.

PREPARATION 3.—3(4),17(20)-DIOXIDE OF 3,11,20-TRI-BUTYROYLOXY-3,9(11),17(20)-PREGNATRIENE

Following the procedure given in Preparation 1, the pregnane-3,11,20-trione is converted to the 3,11,20-tri-enol butyrate with butyric anhydride, which is in turn treated with peracetic acid to yield the 3(4),17(20)-dioxide of 3,11,20-tributyroyloxy-3,9(11),17(20)-pregnatriene.

*Example 1.—4,17α-dihydroxypregnane-3,11,20-trione*

Two and two-tenths grams (2.2 grams; 0.00455 mole) of the 3(4),17,(20)-dioxide of 3,11,20-triacetoxy-3,9(11),17(20)-pregnatriene, from Preparation 1 was dissolved in 150 milliliters of ethanol and to the resulting solution was added a solution of three grams of sodium hydroxide (0.075 mole) in 150 milliliters of water. After standing at room temperature for about forty minutes, the reaction mixture was made slightly acidic with ten percent hydrochloric acid solution added in small portions, and the resulting mixture then distilled under reduced pressure at a temperature below about forty degrees centigrade until all the ethanol had been removed. The reaction residue was then extracted with three successive 100-milliliter portions of ether, the extracts combined and washed with fifty-milliliter portions of dilute sodium bicarbonate solution and water, respectively, dried over anhydrous sodium sulfate and evaporated to dryness. One and forty-seven hundredths grams (1.47 grams) of 4,17α-dihydroxypregnane-3,11,20-trione was obtained upon removal of the solvent. The specific rotation was $[\alpha]_D^{23}$ plus 48 degrees (chloroform). Infra-red analysis confirmed the theoretical structure.

*Example 2.—4,17α-dihydroxypregnane-3,11,20-trione*

Using the procedure described in Example 1, the 3(4),17(20)-dioxide of 3,11,20-tripropionyloxy-3,9(11),17(20)-pregnatriene is saponified with sodium hydroxide in ethanol to give 4,17α-dihydroxypregnane-3,11,20-trione.

*Example 3.—4,17α-dihydroxypregnane-3,11,20-trione*

Using the procedure described in Example 1, the 3(4),17(20)-dioxide of 3,11,20-tributyroyloxy-3,9(11),17(20)-pregnatriene is saponified with sodium hydroxide in ethanol to give 4,17α-dihydroxypregnane-3,11,20-trione.

*Example 4.—4,17α-dihydroxypregnane-3,11,20-trione*

Using the procedure described in Example 1, the 3(4),17(20)-dioxide of 3,20-diacetoxy-3,17(20)-pregnadiene-11-one is saponified with sodium hydroxide in ethanol to give 4,17α-dihydroxypregnane-3,11,20-trione. The 3(4),17(20)-dioxide of the 3,20-di-enol acetate of pregnane-3,11,20-trione is prepared by epoxidation, with peracetic acid, of the 3,20-di-enol acetate of pregnane-3,11,20-trione, which is prepared from pregnane-3,11,20-trione under mild acetylation condition with acetic anhydride in the presence of paratoluenesulfonic acid.

In the same manner as illustrated in the above examples, other 3(4),17(20)-dioxides of the tri- and di-enol acylates of pregnane-3,11,20-trione, such as the 3(4),17(20)-dioxide of 3,11,20-triformoxy-3,9(11)17(20)-pregnatriene, 3(4),17(20)-dioxide of 3,11,20-triisobutyroyloxy-3,9(11),17(20)-pregnatriene, 3(4),17(20)-dioxide of 3,11,20-trivaleroyloxy-3,9(11),17(20)-pregnatriene, 3(4),17(20)-dioxide of 3,11,20-trihexanoyloxy-3,9(11),17(20)-pregnatriene, 3(4),17(20)-pregnatriene, 3(4),17(20)-dioxide of 3,11,20-triphenylacetoxy-3,9(11),17(20)-pregnatriene, 3(4),17(20)-dioxide of 3,11,20-trioctanoyloxy-3,9(11),17(20)-pregnatriene, 3(4),17(20)-dioxide of 3,20-diformoxy-3,17(20)-pregnadiene-11-one, 3(4),17(20)-dioxide of 3,20-dibutyroyloxy-3,17(20)-pregnadiene-11-one, 3(4),17(20)-dioxide of 3,20-dioctanoyloxy-3,17(20)-pregnadiene-11-one, and the like, are saponified according to the process of the present invention to yield the novel 4,17α-dihydroxypregnane-3,11,20-trione.

*Example 5.—4-acetoxy-17α-hydroxypregnane-3,11,20-trione*

One and forty-seven hundredths grams (1.47 grams; 0.0041 mole) of 4,17α-dihydroxypregnane-3,11,20-trione from Example 1 was dissolved in 25 milliliters of pyridine and 25 milliliters of acetic anhydrdide and the resulting mixture permitted to stand overnight at room temperature. The reaction mixture was then poured into ice-water and extracted with three successive fifty-milliliter portions of ether. The extracts were combined, washed with successive 100-milliliter portions of five percent sodium bicarbonate solution and water, respectively, dried over anhydrous sodium sulfate and evaporated to dryness. The resulting residue was purified by chromatography over Florisil (magnesium silicate) and recrystallized several times from isopropyl ether to give pure 4-acetoxy-17α-hydroxypregnane-3,11,20-trione, melting at 214–218 degrees centigrade. The specific rotation was $[\alpha]_D^{24}$ plus 105 degrees (chloroform).

*Analysis.*—Percent calculated for $C_{23}H_{32}O_6$: C, 68.47; H, 7.74. Found: C, 68.47; H,8.09.

*Example 6.—4-propionyloxy-17α-hydroxypregnane-3,11,20-trione*

Following the procedure given in Example 5, 4-propionyloxy-17α-hydroxypregnane-3,11,20-trione is prepared by the reaction of 4,17α-dihydroxypregnane-3,11,20-trione with propionic anhydride in pyridine.

*Example 7.—4-butyroyloxy-17α-hydroxypregnane-3,11,20-trione*

Following the procedure given in Example 5, 4-butyroyloxy-17α-hydroxypregnane-3,11,20-trione is prepared by the reaction of 4,17α-dihydroxypregnane-3,11,20-trione with butyric anhydride in pyridine.

*Example 8.—4-benzoyloxy-17α-hydroxypregnane-3,11,20-trione*

Following the procedure given in Example 5, 4-benzoyloxy-17α-hydroxypregnane-3,11,20-trione is prepared by the reaction of 4,17α-dihydroxypregnane-3,11,20-trione with benzoic anhydride in pyridine.

*Example 9.—4-octanoyloxy-17α-hydroxypregnane-3,11,20-trione*

Following the procedure given in Example 5, 4-octanoyloxy-17α-hydroxypregnane-3,11,20-trione is prepared by the reaction of 4,17α-dihydroxypregnane-3,11,20-trione with octanoic anhydride in pyridine.

*Example 10.—4-acetoxy-17α-hydroxypregnane-3,11,20-trione*

Following the procedure given in Example 5, 4-acetoxy-17α-hydroxypregnane-3,11,20-trione is prepared by the reaction of 4,17α-dihydroxypregnane-3,11,20-trione with acetyl chloride in pyridine.

Following the procedure of the Examples 5 through 10, other 4-acylates of 4,17α-dihydroxypregnane-3,11,20-triones such as 4-formoxy-17α-hydroxypregnane-3,11,20-trione, 4-valeroyloxy-17α-hydroxypregnane-3,11,20-trione, 4-hexanoyloxy-17α-hydroxypregnane-3,11,20-trione, 4-heptanoyloxy-17α-hydroxypregnane-3,11,20-trione, 4-phenylacetoxy-17α-hydroxypregnane-3,11,20-trione, and the like, are prepared by reaction of 4,17α-dihydroxypregnane-3,11,20-trione with the suitable acid, acid anhydride or chloride of the corresponding acid. Likewise, following the procedures of Examples 5 through 10, other 4-acylates of 4,17α-dihydroxypregnane-3,11,20-trione, such as 4-malonyloxy-17α-hydroxypregnane-3,11,20-trione, 4-phthalyloxy-17α-hydroxypregnane-3,11,20-trione, 4-cyclopentanoyloxy-17α-hydroxypregnane-3,11,20-trione, 4-cyclohexanoyloxy - 17α - hydroxypregnane - 3,11,20 - trione, and 4-toluyloxy-17α-hydroxypregnane-3,11,-20-trione, are prepared by reaction of 4,17α-dihydroxypregnane-3,11,20-trione with the appropriate anhydride or acid chloride of the corresponding organic carboxylic acid.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A 4-acyloxy-17α-hydroxypregnane-3,11,20-trione, wherein the acyloxy group is of the formula AcO, Ac being the acyl radical of an unsubstituted monocarboxylic hydrocarbon acid containing from one to eight carbon atoms, inclusive.

2. 4-acetoxy-17α-hydroxypregnane-3,11,20-trione.

3. 4-propionyloxy-17α-hydroxypregnane-3,11,-20-trione.

4. 4-benzoyloxy-17α-hydroxypregnane-3,11,20-trione.

5. 4 - octanoyloxy - 17α - hydroxypregnane-3,11,20-trione.

6. The process for the production of 4,17α-dihydroxypregnane-3,11,20-trione, which includes: saponifying (1) a 3(4),17(20)-dioxide of a poly-enol acylate of pregnane-3,11,20-trione, in solution in an organic solvent, with (2) a saponifying agent to produce 4,17α-dihydroxypregnane-3,11,-20-trione.

7. The process for the production of 4,17α-dihydroxypregnane-3,11,20-trione, which includes: saponifying (1) a 3(4),17(20)-dioxide of a tri-enol acylate of pregnane-3,11,20-trione wherein the acyloxy groups are of the formula AcO, Ac being the residue of an organic carboxylic acid containing from one to eight carbon atoms, inclusive, in solution in an organic solvent, with (2) a solution of an alkali metal hydroxide to produce 4,17α-dihydroxypregnane-3,11,20-trione.

8. The process for the production of 4,17α-dihydroxypregnane-3,11,20-trione, which includes: saponifying (1) the 3(4),17(20)-dioxide of 3,11,-20-triacetoxy-3,9(11),17(20)-pregnatriene, in solution in ethanol, with (2) a solution of sodium hydroxide to produce 4,17α-dihydroxypregnane-3,11,20-trione.

9. The process for the production of 4,17α-dihydroxypregnane-3,11,20-trione, which includes: saponifying (1) a 3(4),17(20)-dioxide of a di-enol acylate of pregnane-3,11,20-trione, wherein the acyloxy groups are of the formula AcO, Ac being the residue of an organic carboxylic acid containing from one to eight carbon atoms, inclusive, in solution in an organic solvent, with (2) a solution of an alkali metal hydroxide to produce 4,17α-dihydroxypregnane-3,11,20-trione.

10. The process for the production of 4,17α-dihydroxypregnane-3,11,20-trione, which includes: saponifying (1) the 3(4),17(20)-dioxide of 3,20-diacetoxy-3,17(20)-pregnadiene-11-one, in solution in ethanol, with (2) a solution of sodium hydroxide to produce 4,17α-dihydroxypregnane-3,11,20-trione.

11. 4,17α-dihydroxypregnane-3,11,20-trione.

12. A compound selected from the group consisting of a 4,17α-dihydroxypregnane-3,11,20-trione and a 4-acyloxy-17α-hydroxypregnane-3,11,20-trione wherein the acyloxy group is of the formula AcO, Ac being the acyl radical of a hydrocarbon carboxylic acid containing from one to eight carbon atoms, inclusive.

13. The process for the production of a 4-acyloxy - 17α - hydroxypregnane - 3,11,20 - trione which includes: (1) saponifying a 3(4),17(20)-dioxide of a poly-enol acylate of pregnane-3,11,20-trione, in solution in an organic solvent, with a saponifying agent to obtain 4,17α-dihydroxypregnane-3,11,20-trione, and (2) acylating the 4,17α-dihydroxypregnane-3,11,20-trione obtained with an acylating agent selected from the group consisting of acid chlorides and acid anhydrides of organic carboxylic acids to produce a 4-acyloxy-17α-hydroxypregnane-3,11,20-trione.

14. The process for the production of a 4-acyloxy - 17α - hydroxypregnane - 3,11,20 - trione which includes: (1) saponifying a 3(4),17(20)-dioxide of a tri-enol acylate of pregnane 3,11,20-trione wherein the acyloxy groups are of the formula AcO, Ac being the residue of an organic carboxylic acid containing from one to eight carbon atoms, inclusive, in solution in an organic solvent, with a solution of an alkali metal hydroxide to obtain 4,17α-dihydroxypregnane-3,11,20-trione, (2) acylating the 4,17α-dihydroxypregnane-3,11,20-trione obtained with an acylating agent selected from the group consisting of acid chlorides and acid anhydrides of organic carboxylic acids in excess of the amount theoretically required to produce the desired 4-acylate, and (3) recovering the thus-produced 4-acyloxy-17α-hydroxypregnane-3,11,20-trione from the reaction product.

15. The process for the production of 4-acetoxy - 17α - hydroxypregnane - 3,11,20-trione which includes: (1) saponifying the 3(4),17(20)-dioxide of 3,11,20 - triacetoxy - 3,9(11),17(20) - pregnatriene, in solution in ethanol, with a solution of sodium hydroxide to obtain 4,17α-dihydroxypregnane-3,11,20-trione, (2) acetylating the 4,17α-dihydroxypregnane-3,11,20-trione obtained with acetic anhydride in excess of the amount theoretically required to produce the desired 4-acetoxy - 17α - hydroxypregnane - 3,11,20-trione, and pyridine, at a temperature between about zero and about one hundred degrees centigrade, and (3) recovering the thus-produced 4-acetoxy-17α-hydroxypregnane-3,11,20-trione.

16. The process for the production of a 4-acyloxy - 17α - hydroxypregnane - 3,11,20-trione which includes: (1) saponifying a 3(4),17(20)-dioxide of a di-enol acylate of pregnane-3,11,20-trione wherein the acyloxy groups are of the formula AcO, Ac being the residue of an organic carboxylic acid containing from one to eight carbon atoms, inclusive, in solution in an organic solvent, with a solution of an alkali metal hydroxide to obtain 4,17α - dihydroxypregnane-3,11,20-trione, (2) acylating the 4,17α-dihydroxypregnane-3,11,20-trione with an acylating agent selected from the group consisting of acid chlorides and acid anhydrides of organic carboxylic acids in excess of the amount theoretically required to produce the desired 4-acylate, and (3) recovering the thus-produced 4-acyloxy-17α-hydroxypregnane-3,11,20-trione from the reaction product.

17. The process for the production of 4-acetoxy - 17α - hydroxy-pregnane - 3,11,20-trione which includes: (1) saponifying the 3,20-diacetoxy-3,17(20)-pregnadiene-11-one in solution in ethanol, with a solution of sodium hydroxide to obtain 4,17α-dihydroxypregnane-3,11,20-trione, (2) acetylating the 4,17α-dihydroxypregnane-3,11,20-trione with acetic anhydride in excess of the amount theoretically required to produce the desired 4-acetoxy-17α-hydroxypregnane-3,11,20-trione, and pyridine, at a temperature between about zero and about one hundred degrees centigrade, and (3) recovering the thus-produced 4 - acetoxy - 17α - hydroxypregnane-3,11,20-trione.

GEORGE B. SPERO.
ROBERT H. LEVIN.

References Cited in the file of this patent

UNITED STATES PATENTS

| Number | Name | Date |
|---|---|---|
| 2,316,142 | Cartland | Apr. 6, 1943 |
| 2,380,483 | Wagner | July 31, 1945 |
| 2,447,325 | Gallagher | Aug. 17, 1948 |